UNITED STATES PATENT OFFICE.

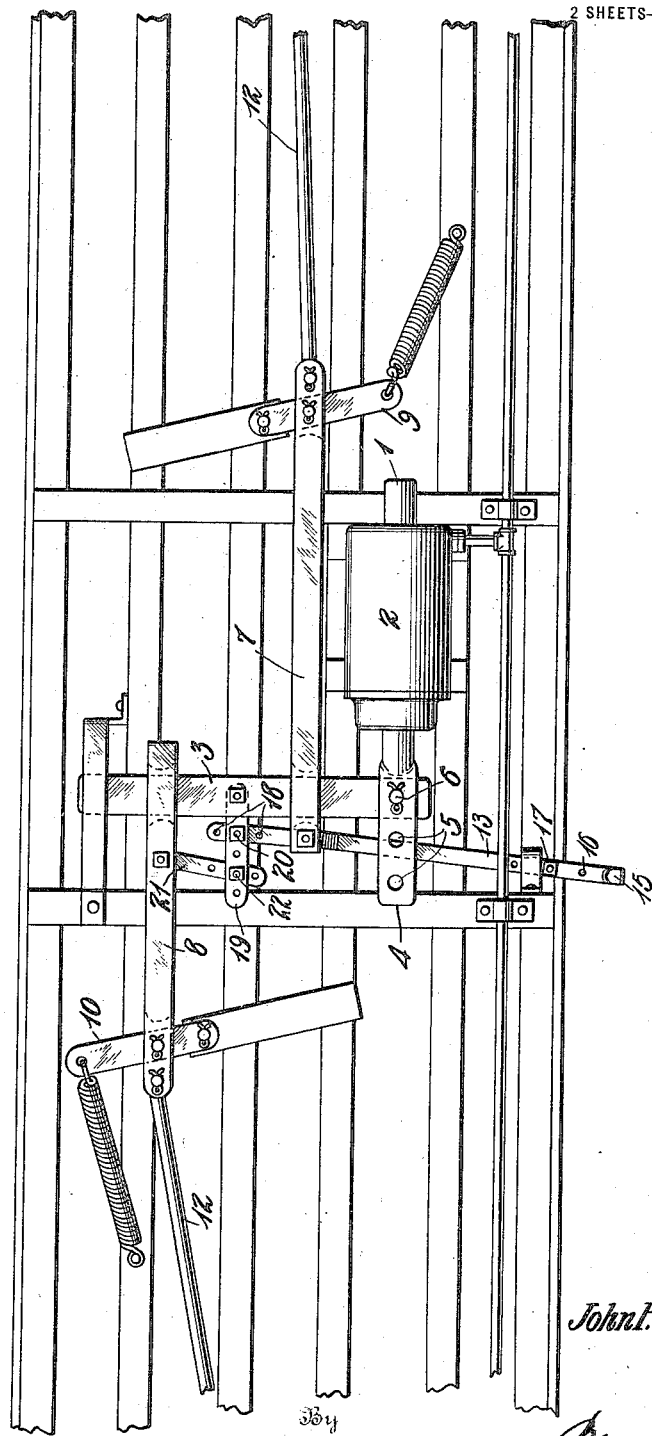

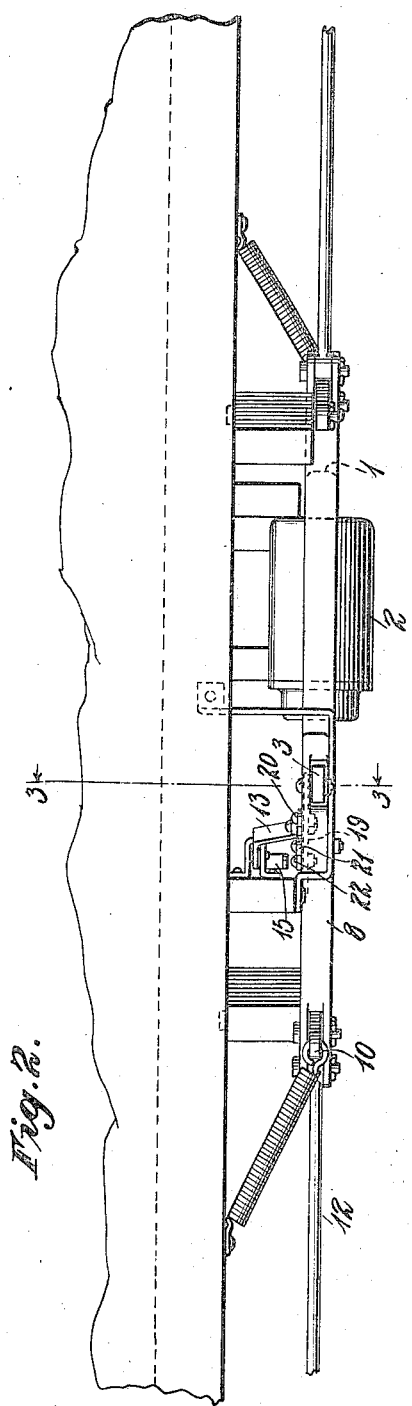

JOHN P. CARLSON, OF THE DALLES, OREGON.

RAILWAY BRAKE.

1,424,393.

Specification of Letters Patent.   Patented Aug. 1, 1922.

Application filed July 19, 1921. Serial No. 485,886.

*To all whom it may concern:*

Be it known that I, JOHN P. CARLSON, citizen of the United States, residing at The Dalles, in the county of Wasco and State of Oregon, have invented certain new and useful Improvements in Railway Brakes, of which the following is a specification.

The invention relates to improvements in brake mechanisms for railway cars.

It is an object of the invention to provide a railway car brake wherein the pressure applied to the car wheels by the braking mechanism may be varied to prevent injury to the car wheel, but at the same time apply ample braking power to said wheels.

As is well known, car wheels when new, have a coarse surface and when the conventional type of braking mechanism is employed when the brakes are operated, the maximum braking power is applied to the wheels, which serves to cause said wheels to develop uneven or flat surfaces. Frequently wheels must be removed from cars when a first loading point is reached because of the development of flat surfaces thereon. Then again, empty cars require less braking power than loading cars, and with present day constructions the brakes operate to apply the same braking power to either a loaded or unloaded railway car.

The invention broadly comprehends manual means for regulating the braking power applied to railway car wheels. With this conception in mind, the invention consists of a shiftable member adapted to be set to a determined position for controlling the position of brake operating rods on the brake operating lever for varying the throw or movement of said rods when the lever is operated from the compressed air cylinder.

In the accompanying drawings, I have shown one embodiment of the invention, but the construction may be materially changed or altered without departing from the spirit thereof.

In the drawings, Figure 1 represents a view of the underside of a car and Figures 2, 3 and 4 are detail views.

Referring now more particularly to the drawings wherein like reference characters indicate corresponding parts, the numeral 1 designates a brake operating member, which is preferably connected with a piston operating in the compressed air cylinder 2, to which there leads the usual compressed air line controlled by the operator of the car. This member 1 at its outer end is connected to a brake operating lever 3, through the medium of the yoke 4, said yoke having a plurality of apertures 5 therein through which the fastening pin 6 passes, the object of these apertures being to adjust the position of the brake operating lever 3 as the occasion may require.

The brake operating lever 3 extends laterally beneath the vehicle, and slidably associated therewith are the brake operating arms 7 and 8. These arms have open portions receiving the brake lever, and are shifted in consonance with a movement imparted to said lever. The arms 7 and 8 at their rear ends slidably engage links 9 and 10 connected with suitable springs for the purpose of normally maintaining the brakes in an inoperative position, the arms in turn being pivotally connected with brake operating devices 12 extending to the brakes in a manner similar to the constructions now employed.

Extending transversely of the car body is a manually shiftable operating arm 13, having an operating handle 15 accessible from the side of the car and a plurality of apertures 16 therein through which a retaining element 17 passes. This brake operating arm passes through a keeper so that when the retaining elements 17 are passed through the selected aperture 16 said arm is maintained in its adjusted position. At the outer end this arm is attached to the brake arm 7 for the purpose of shifting said rod over the brake lever 3 actuated by the operating rod 1 connected with a manual operating device or the fluid pressure motor. The said rod 13 is likewise provided with a plurality of apertures 18 near the outer end thereof, and pivotally connected with said rod is an outstanding link 19, having one end thereof pivotally connected with the brake lever 13 by the bolt 20, while the other end thereof is pivotally connected to a second link 21 by the bolt 22, which link is in turn connected with the brake operating arm 8. It will therefore be seen that as the lever 13 is moved outwardly it correspondingly moves the arm 7 in consonance with its movement, at the same time swinging the link 19 pivotally connected with the lever 3, this causing the outer end of the link to move shifting the link 21 and thereby moving the arm 8 over the lever. The outer end of the rod 13 is provided with a plurality of apertures herein shown, and the interconnected links 19 and 21 are likewise apertured so as to permit of various adjustments in the throw of the brake operating levers 7 and 8.

From the foregoing description it will be seen that the main brake operating lever 3 shifted through the medium of the main operating lever 1, and the connecting pin 6 in effect constitutes the axis of said lever 3. When said lever 3 is moved longitudinally, one edge thereof engage the wall of the arm 7, while the other edge engages the wall of the arm 8, causing said arms to be moved during the movement of the lever, which arms in turn actuate the brakes. Assuming that new wheels have been applied to the car, or that the car is very lightly loaded, then the operator grasps the rod 13 and moves the same to its most extended outward position, placing the locking pin 17 in the appropriate aperture 16 to hold the rod in this position. This movement of the rod causes the brake arms 7 and 8 through the medium of the connected link members to be moved toward the pivot or axis 6 constituting the connection between the main operating member 1 and the lever 3. When the operating member 1 is then moved by manual or power means, then the brake arms 7 and 8 being comparatively close to its pivotal point are only moved a short distance applying a limited amount of braking power to the car wheels, but of course sufficient to stop the movement of the car. When a greater or maximum braking power is needed, then the rod 13 is adjusted or shifted inwardly, which causes the arms 7 and 8 to be moved away from the pivot point or axis 6 of the lever 3, so that said arms when the lever is actuated are given an increased throw or movement, correspondingly imparting greater braking power to the car brakes. The power applied to the brakes can range from a maximum to a minimum braking power with a manually controlled means for regulating the application of the brakes to the train wheels.

In the accompanying drawings I have shown a preferred embodiment of my invention, but of course many changes in the construction and arrangement of the parts can be made without departing from the spirit of this invention.

Having thus described the invention, what I claim is:

1. In a railway brake, the combination with a braking lever, of a pair of brake operating arms connected therewith, mechanism for actuating brakes connected with said arms, means for operating the brake lever, and manually controlling means for regulating the length of movement of said brake operating arms.

2. In a railway brake, the combination with a braking lever, of a pair of brake operating arms connected therewith, mechanism for actuating brakes connected with said arms, means for operating the brake lever, and manually controlling means for regulating the length of movement of said brake operating arms, said regulating means comprising a shiftable element adapted to move said brake actuating arms relative to the brake operating lever.

3. A railway car brake, comprising a braking lever, means pivotally connected therewith for operating said lever, brake operating arms adapted to be actuated by said lever, and means connecting said brake operating arms with railway brakes, and means for adjusting said brake operating arms on said brake lever including a shiftable rod having connections with each of said arms and adapted when moved to shift said arms equal distances in the same direction on said lever, whereby the brake operating arms are moved determined variable distances upon the actuation of the brake lever.

4. In a railway brake, the combination with a brake lever, means for operating the same pivotally connected with the lever intermediate its ends, brake operating arms adapted to be shifted by said lever, and means for adjusting said brake operating arms on said lever to vary the throw of said arms upon the actuation of the lever.

5. In a railway brake, the combination with a brake lever, means for operating the same pivotally connected with the lever intermediate its ends, brake operating arms adapted to be shifted by said lever, and means for adjusting said brake operating arms on said lever to vary the throw of said arms upon the actuation of the lever, said means comprising a manually operated member.

6. In a railway brake, the combination with a brake lever, means for operating the same pivotally connected with the lever intermediate its ends, brake operating arms adapted to be shifted by said lever, and means for adjusting said brake operating arms on said lever to vary the throw of said arms upon the actuation of the lever, said means comprising a manually operated member connected with link sections, one of said link sections being pivoted to the lever and the other to a brake arm.

7. In a railway brake, the combination with an operating lever, actuating means pivotally connected with said lever intermediate its ends, oppositely disposed brake arms slidably associated with the lever and spaced from one another, said arms being adapted to be actuated upon a movement of the lever to apply the railway brakes, and manual means for varying the throw of said arms.

8. In a railway brake, the combination with an operating lever, actuating means pivotally connected with said lever intermediate its ends, oppositely disposed brake arms slidably associated with the lever and spaced from one another, said arms being adapted to be actuated upon a movement of the lever to apply the railway brakes, and manual means for varying the throw of said arms, said means comprising a manually operable shifting rod connected with both of said arms for shifting said arms in consonance equal distances over said operating lever.

9. In a railway brake, the combination with an operating lever, actuating means pivotally connected with said lever intermediate its ends, oppositely disposed brake arms slidably associated with the lever and spaced from one another, said arms being adapted to be actuated upon a movement of the lever to apply the railway brakes, and manual means for varying the throw of said arms, said means comprising a manually operable shifting rod connected with both of said arms for shifting said arms in consonance equal distances over said operating lever, said shifting rod being connected near one end to one of the arms and connected to said other arm through the medium of links, one of said links being pivotally connected at one end to the operating lever.

In testimony whereof I affix my signature.

JOHN P. CARLSON.